United States Patent [19]

Dougherty

[11] Patent Number: 5,208,310
[45] Date of Patent: May 4, 1993

[54] METHOD FOR PREPARATION OF VERY HIGH MOLECULAR WEIGHT POLYCARBORANE SILOXANES

[75] Inventor: Thomas K. Dougherty, Playa Del Rey, Calif.

[73] Assignee: Hughes Aircraft Company, Los Angeles, Calif.

[21] Appl. No.: 807,364

[22] Filed: Dec. 16, 1991

[51] Int. Cl.$^5$ .............................. C08G 77/56
[52] U.S. Cl. ........................ 528/5; 528/34; 528/41
[58] Field of Search ................. 528/5, 34, 41

[56] References Cited

U.S. PATENT DOCUMENTS 3,445,427 5/1969 Larchar, Sr. .................... 528/5
3,733,298 5/1973 Knollmueller .................. 528/5

OTHER PUBLICATIONS

Stewart et al, "D2-m-Carborane Siloxanes. 7. Synthesis and Properties of Ultra-High Molecular Weight Polymer," *Macromolecules*, vol. 12, No. 3, May-Jun. 1979, pp. 373-377.

*Primary Examiner*—Melvyn I. Marquis
*Attorney, Agent, or Firm*—Mary E. Lachman; M. W. Sales; W. K. Denson-Low

[57] ABSTRACT

An improved method for the preparation of very high molecular weight polycarborane siloxane polymers in which each of the reactants is first provided in an ultra-pure state by a series of recrystallization procedures in specific solvents. The reactants are then reacted in the following series of steps by:

(a) providing ultra-pure carborane bisdimethyl silanol in dried chlorobenzene solvent, to form a slurry and cooling said slurry to $-10°\pm5°$ C.;

(b) adding to said slurry a mixture of ultra-pure dimethylbisureido silane and ultra-pure methylphenylbisureido silane to form a reaction mixture at $-10°\pm5°$ C.;

(c) separating from said reaction mixture a silanol endcapped prepolymer of said polycarborane siloxane polymer;

(d) dissolving said prepolymer in chlorobenzene to form a solution; and (e) adding to said prepolymer solution an excess of said ultra-pure bisureido silane selected from the group consisting of dimethylbisureido silane, methylphenylbisureido silane and a mixture thereof, to form said very high molecular weight polycarborane siloxane polymer.

Alternatively, step (e) may be performed at 60°-70° C. to further increase the molecular weight of the polymer. In an alternative process, step (b) is performed at $-15°$ to $-20°$ C. for 6 to 20 hours and steps (c) through (e) are omitted.

3 Claims, No Drawings

METHOD FOR PREPARATION OF VERY HIGH MOLECULAR WEIGHT POLYCARBORANE SILOXANES

This invention was made with United States Government support under Contract No. F33615-86-C-5081 awarded by the Department of the Air force. The United States Government has certain rights in this invention.

BACKGROUND OF THE INVENTION

1. Field of the Invention

The present invention relates generally to a method for preparing very high molecular weight polycarborane siloxanes. More specifically, the present invention relates to such a method in which the molecular weight of the polycarborane siloxanes is significantly and reliably increased by providing each of the reactant materials in an ultra-pure state by successive recrystallization procedures.

2. Description of Related Art

Materials which are used in a space environment must be able to withstand extreme conditions, such as exposure to temperatures from $-100°$ to $+250°$ F. ($-73°$ to $+121°$ C.) for extended periods of time, such as 10 years, and exposure to vacuum conditions in space. In addition, materials in space are exposed to high energy ultraviolet radiation, high energy protons and high energy electrons, all of which can produce significant damage.

In the case of solar cells used in space, a cover glass, usually formed of silica, is bonded to the front of each cell to protect the photovoltaic junction from radiation and particle damage. However, even with such a glass cover, high energy electron damage does occur. It has been found that the effect of electron radiation can be minimized if the cells are run at higher temperatures or periodically cycled to higher temperatures. In the case of silicon solar cells, electron damage can be annealed and the cell efficiency optimized by heating the cells to about 60°-100° C. At these temperatures, known adhesives used to bond the cover glass to the solar cell, such as dimethyl silicone resins, are sufficient. However, gallium arsenide type solar cells are currently being developed which have much higher efficiency than silicon solar cells at increased temperatures. In order to anneal the gallium arsenide cells for electron damage, a temperature in the range of 250°-350° C. is required. Known cover glass adhesives, such as DC-93-500, a two-part room temperature vulcanizing dimethyl silicone resin available from Dow Corning, have been indicated to be operational at temperatures up to 200° C. Thus, a need exists for an adhesive which not only meets the previously discussed requirements of the space environment, but also can withstand annealing temperatures in excess of 200° C.

One material which has been previously studied for its thermal stability is a class of ultra-high molecular weight carborane siloxane polymers, as described by Stewart et al in the publication "D2-m-Carborane Siloxanes. 7. Synthesis and Properties of Ultra-High Molecular Weight Polymer," in *Marcomolecules*, Vol. 12, No. 3, May-June 1979, at pages 373-377. In the method of Stewart et al, the carborane siloxane polymers are formed by:

(a) forming a slurry of carborane bisdimethyl silanol in dried chlorobenzene solvent and cooling the slurry to $-10°\pm5°$ C.;
(b) adding to the slurry a mixture of dimethylbisureido silane and methylphenylbisureido silane to form a reaction mixture at $-10°\pm5°$ C.;
(c) separating from the reaction mixture a silanol end-capped prepolymer of the polycarborane siloxane polymer;
(d) dissolving the prepolymer in chlorobenzene to form a solution; and
(e) adding to the prepolymer solution an excess of the above-noted bisureido silanes.

Stewart et al reported that the polymers so formed had molecular weights in excess of $10^6$, which was believed to be due to the technique of the reverse addition of the bisureido silanes to the carborane disilanol in chlorobenzene. However, as disclosed by Stewart et al at page 375, right column, first and second full paragraphs, consistent and reliable results were not achieved. One problem was that a reliable technique for purifying the prepolymer was not found, and consequently the prepolymer was degraded by reaction with amine by-products. Another problem was that many of the prepolymer samples were not capable of being advanced to the high molecular weight polymers, and no cause for this difficulty was defined. In addition, attempts to replicate the experiments of Stewart et al did not result in polymers of the highest molecular weight reported by Stewart et al, as discussed in further detail herein in Example 6. As discussed by Stewart et al, optimum mechanical and thermal properties of these polymers occur only at high molecular weights.

Since the carborane siloxane polymers of Stewart et al at high molecular weight have desirable high temperature properties and could be useful in a space environment, it would be advantageous to have a process for synthesizing these polymers reliably at very high molecular weights.

SUMMARY OF THE INVENTION

The general purpose of the present invention is to provide a method for reproducibly forming a very high molecular weight polycarborane siloxane polymer which is particularly useful in the space environment. These polymers possess all of the advantages of the above-mentioned prior art polymers while overcoming their above-noted significant disadvantages.

The above-described general purpose of the present invention is accomplished by first providing each of the reactants in an ultra-pure state by successive recrystallization procedures which include:

(i) providing carborane bisdimethyl silanol in an ultra-pure state by dissolving said carborane bisdimethyl silanol in a dry, oxygen-free mixture of hexane and toluene by heating to approximately 70° C. in an inert atmosphere to form a first solution, filtering said first solution, and cooling said first filtered solution to form a first crystalline product, and repeating said dissolving of said first crystalline product, said filtering, and said cooling for a total of 2 to 5 additional times;

(ii) providing dimethylbisureido silane in an ultra-pure state by dissolving said dimethylbisureido silane in a dry, oxygen-free mixture of diisopropyl ether and tetrahydrofuran by heating to approximately 60° C. in an inert atmosphere to form a second solution, filtering said second solution, and cooling said second filtered solution to form a second crystalline product, and repeating said dissolving of said second crystalline product, said filtering, and said cooling one time; and (iii) providing methylphenylbisureido silane in an ultra-pure state by dissolving said methylphenylbisureido silane in dry, oxygen-free diisopropyl ether to form a third solution, filtering said third solution, adding dry hexane to said third filtered solution to form a mixture and cooling said mixture to room temperature, to form a third crystalline product and repeating said dissolving of said third crystalline product, said filtering, said adding of hexane and said cooling two additional times;

Then, the ultra-pure reactants are subjected to the following process steps:

(a) providing said ultra-pure carborane bisdimethyl silanol in dried chlorobenzene solvent, to form a slurry and cooling said slurry to $-15°\pm5°$ C.;

(b) adding to said slurry a mixture of said ultra-pure dimethylbisureido silane and said ultra-pure methylphenylbisureido silane to form a reaction mixture at $-10°\pm5°$ C.;

(c) separating from said reaction mixture a silanol end-capped prepolymer of said polycarborane siloxane polymer;

(d) dissolving said prepolymer in chlorobenzene to form a solution; and (e) adding to said prepolymer solution an excess of said ultra-pure bisureido silane selected from the group consisting of dimethylbisureido silane, methylphenylbisureido silane or a mixture thereof, to form said very high molecular weight polycarborane siloxane polymer.

The polycarborane siloxane polymer so formed has a number average molecular weight in excess of 120,000, and these results are achieved on a reproducible and consistent basis.

In an alternative embodiment of the present invention, step (e) above is performed at a temperature of 60° to 70° C. and the resulting polymer has a molecular weight in excess of 600,000.

In yet another alternative embodiment of the present invention, a very high molecular weight polycarborane siloxane polymer is formed by the above-described process except that step (b) is performed at a temperature of $-15°$ $-15°$ to $-20°$ C. for 6 to 20 hours, and steps (c) through (e) are omitted.

DESCRIPTION OF THE PREFERRED EMBODIMENTS

High molecular weight polycarborane siloxane polymers have been previously formed by the process of Stewart et al as described in the "Description of Related Art" herein. However, as previously discussed, the process of Stewart et al had several problems and did not reproducibly form very high molecular weight polymers which had the desired mechanical and thermal properties. Experimental data supporting this conclusion is presented in Example 6 herein.

In accordance with a first embodiment of the present invention, a significant increase in the molecular weight of polycarborane siloxane polymers is reliably achieved by modifying the process of Stewart et al by providing ultra-pure reactants. These reactants are:

(1) carborane bisdimethyl silanol of the following formula:

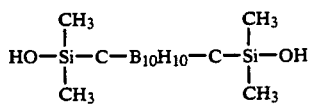

(2) dimethylbisureido silane, optionally referred to as Bis(N-phenyl-N'-pyrrolidinyl) dimethylsilane, of the following formula:

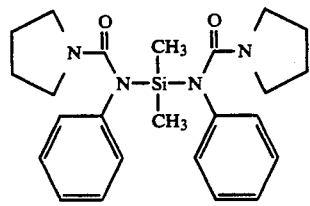

(3) methylphenylbisureido silane, optionally referred to as Bis(N-phenyl-N'-pyrrolidinyl)methylphenlysilane, of the following formula:

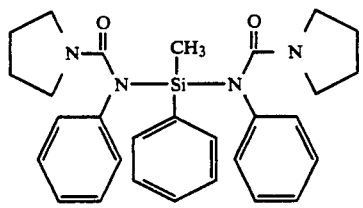

Each of the above-noted reactants is purified by a series of recrystallization procedures in specific solvents as described in detail below.

Carboranebisdimethyl silanol is purified by successive recrystallizations from hexane/toluene. Both hexane and toluene are obtained from a distillation apparatus designed for transfer of these liquids without the introduction of air or water. The solvents are transferred by means of double needle and Schlenk technique as described in Shriver and Drezdon, *Manipulation of Air Sensitive Compounds*, Wiley, 1986. The dry, oxygen-free solvents are brought into a standard dry box into which has previously been placed the crude carborane bisdimethyl silanol. The crude materials are recrystallized several times as described in detail in Example 2 herein. After several recrystallizations have taken place, a sample of the dried recrystallized product is removed from the dry box and analyzed for melting point by differential scanning calorimetry. This technique allows for careful monitoring of the melting point (and purity) of the final product. After successive recrystallizations have been completed the white crystalline product is dried at elevated temperature in vacuo and then stored for further use in the dry box.

Bis(N-phenyl-N-'-pyrrolidinyl) dimethylsilane is also purified by successive recrystallizations. The preferred solvent system for this recrystallization is diisopropylether/tetrahydrofuran. Example 3 herein describes the process in detail. Because of the extreme moisture sensitivity of these compounds, analysis of the purified materials by differential scanning calorimetry is not possible. Instead, a nuclear magnetic resonance (NMR) sample (in dry chlorobenzene) of the purified material is made and then sealed in the dry box. Proton NMR analysis of the recrystallized bisureido compound in this and other cases has unequivocally established that purification of these compounds must be done in the presence of dry ethereal solvents.

Bis (N-phenyl-N'-pyrrolidinyl) methylphenylsilane is purified in the same manner as the compound immediately above except that the preferred solvent system for recrystallization of this compound is diisopropyl ether/-hexane. Details of this purification procedure are given in Example 4 herein.

After purification, the above-noted reactants are reacted to first form a prepolymer, or silanol end-capped low molecular weight oligomer of polycarborane siloxane, and to then advance the molecular weight of the prepolymer. The reactants are reacted in the following series of steps by:
(a) providing ultra-pure carborane bisdimethyl silanol in dried chlorobenzene solvent, to form a slurry and cooling said slurry to $-10° \pm 5°$ C.;
(b) adding to said slurry a mixture of ultra-pure dimethylbisureido silane and ultra-pure methylphenylbisureido silane to form a reaction mixture at $-10° \pm 5°$ C.;
(c) separating from said reaction mixture a silanol end-capped prepolymer of said polycarborane siloxane polymer;
(d) dissolving said prepolymer in chlorobenzene to form a solution; and
(e) adding to said prepolymer solution an excess of said bisureido silane selected from the group consisting of dimethylbisureido silane, methylphenylbisureido silane and a mixture thereof, to form said very high molecular weight polycarborane siloxane polymer.

Further details of this reaction are discussed in Example 5 herein, where the molecular weights of the product are indicated as being from 120,000 to 175,000.

By contrast, polymer samples prepared by the method of Stewart et al, previously referenced, had molecular weights of only 14,000 to 47,000, as discussed in Example 6 herein. Thus, it is evident that the method of the present invention produces polycarborane siloxane polymers having significantly higher molecular weights than those available by the method of Stewart et al.

In accordance with a second embodiment of the present invention, the molecular weight of the polycarborane siloxane polymer is increased even further by a process in which the prepolymer is advanced in molecular weight at elevated temperature. The procedure described above for the first embodiment of the present invention is followed, except that step (e) is performed at a temperature within the range of 60° to 70° C. The resulting polymer has a molecular weight of about 600,000. Example 7 herein provides further detail on this embodiment of the present invention, from which it may be seen that a significant increase in the molecular weight of the polycarborane siloxane polymer is achieved in this alternative embodiment.

In accordance with a third embodiment of the present invention, very high molecular weight polycarborane siloxane polymers are formed in a one-step process. The procedure described above for the first embodiment of the present invention is followed for purification of the starting materials and for the first addition of the bisureido silane reactants to the carborane bisdimethyl silanol in step (b). After this addition has been completed, the reaction mixture is held at a temperature in the range of $-15°$ to $-20°$ C. for about 6 to 20 hours. Thus, steps (c) through (e) in the first embodiment are omitted. The resulting polymer has a molecular weight of about 400,000. Example 8 herein presents further detail of this alternative embodiment of the present invention.

The polymers formed in accordance with the present invention are optically clear, thermally stable, have good processing characteristics, are highly resistant to atomic oxygen degradation, and are especially well suited for use in a space environment. In addition, these polymers are formed reproducibly and routinely at high molecular weights, thus overcoming a prior art deficiency. These polymers are useful, among other things, for bonding solar cell covers to solar cells and solar cells to the underlying substrate, as hardened ablative heat shields, thermally stable optical coatings, spacecraft thermal control coatings and other components. These polymers may also be used to form O-rings and for other elastomer applications.

Examples of practice of the present invention are described below.

EXAMPLE 1

This example describes the general procedure for the drying and manipulation of water and air sensitive solvents which are used in the remaining Examples herein.

Hexane and toluene, as well as the ethereal solvents, tetrahydrofuran and diisopropyl ether used in Examples 2-4 were purified by refluxing about 2 liters of the solvent over sodium metal (about 10 g) for 24–48 hours. At this time benzophenone (about 5 g), was added. When the characteristic blue violet color of the benzophenone radical anion was formed, the solvent was judged to be sufficiently dry and oxygen-free for use. The solvents were then collected in the top of a solvent still designed specifically for the purpose (Kontes model K47600). The dry solvents were then transferred by means of a dry stainless steel double tipped needle into a dry septum sealed round bottom flask. The flask was then brought into the dry box through three evacuation cycles. These solvents were used for all further manipulations.

EXAMPLE 2

This example describes the purification of carborane bisdimethyl silanol in accordance with the present invention. Carborane bisdimethyl silanol (110 g, formed by the method of Stewart et al), was brought into an inert atmosphere glove box (Vacuum Atmospheres model HE-493). The crude white material was dissolved in a dry oxygen-free hexane-toluene mixture (700 mL hexane and 400 mL toluene) by heating to approximately 70° C. The solution was then filtered through a dry sintered glass funnel into another flask. The flask was cooled to room temperature. Beautiful white crystals of the product formed in the bottom of the flask over a period of 20 h. At this time the filtrate was carefully decanted and dry oxygen-free hexane (about 400 mL) was added to wash the crystalline product. This hexane was decanted. The white crystalline product was then redissolved in a fresh hexane-toluene solution (700 mL hexane and 400 mL toluene) and heated to dissolve the product. The solution was then cooled to room temperature for 20 h to crystallize the product. The filtrate was again decanted and dry oxygen-free hexane was used to wash the crystals. The recrystallization was repeated a total of six times. A small amount of the product was removed for analysis after the fourth, fifth and sixth recrystallizations. This material was analyzed for melting point by differential scanning calorimetry. The sample was held at 70° C. for one hour in an inert atmosphere (nitrogen) in the thermal analyzer to dry the remaining solvent. The hot stage was then heated at 1° C. per minute to observe the melting endotherm. The product was judged to be pure when the melting point approached 100° C. The white crystalline material was then placed into a round bottom flask and dried in vacuo (50° C., 0.05 torr, 48 hours). The yield of dry, pure, polymerization ready carborane bisdimethyl silanol was 74 g, (68% recovery).

EXAMPLE 3

This example describes the purification of dimethylbisureido silane in accordance with the present invention.

In the dry box, dimethylbisureido silane (50 g, crude, made by the procedure of Stewart et al) was heated with stirring in a diisopropyl ether/tetrahydrofuran mixed solvent system (250 mL diisopropyl ether and 100 mL tetrahydrofuran, both purified and transferred as described above). The white solid never fully dissolved. The hot slurry was filtered through a dry sintered glass funnel and the clear ethereal solution was allowed to cool to room temperature and allowed to stand 20 h. At this time the solvent was decanted and the solid was washed with dry hexane (50 mL). The hexane was decanted and the solid was dried in vacuo. Beautiful colorless crystals of product (39.6 g, 79% recovery) were formed in this manner. This entire process was repeated once again to give double recrystallized, polymerization-ready dimethyl bisureido silane.

EXAMPLE 4

This example describes the purification of methylphenylbisureido silane in accordance with the present invention.

Methylphenylbisureido silane (50 g) was purified in an analogous manner as for the bisureido compound in Example 3 above. The crude solid was dissolved by heating in pure diisopropyl ether (200 mL, dried as described above). After filtration through a dry sintered glass funnel, dry hexane (50 mL) was added and the mixture was cooled to room temperature and allowed to stand 16 h. After washing with dry hexane and drying in vacuo, 38.0 g (76% recovery) of methylphenyl bisureido silane was recovered. The process was repeated two times to give polymerization-ready methylphenylbisureido silane.

EXAMPLE 5

This example describes the process for forming the very high molecular weight polycarborane siloxane polymers of the present invention using the ultra-pure reactants formed as described in Examples 1-4 herein.

Step A

Synthesis of Silanol End-Capped Low Molecular Weight Oligomers of Poly Carborane Siloxane (Prepolymer)

Ultra-pure carboranedisilanol (5.6 g) was placed in a three-neck flask. The flask was equipped with a septum, mechanical stirrer, and a solid addition funnel charged with ultra-pure methylphenylbisureido silane (3.2 g) and ultra-pure dimethylbisureido silane (5.6 g). The flask was cooled to −15° C. during which time chlorobenzene (5 mL) was added to the flask. After allowing the flask to cool to bath temperature, the two ureido monomers were added as a mixture of solids in several portions. The addition lasted approximately one hour. The flask was cooled an additional two hours, with stirring. The ice bath was removed and the reaction was stirred overnight. The next day, the reaction was diluted in chlorobenzene (15 mL) and the contents were poured through a sintered glass funnel (to remove the insoluble by-product) into stirred methanol. The precipitated polymer (4.7 g, 63% of theory) was dried in vacuo.

Step B

Advancement of Molecular Weight of Prepolymer

Into a round bottom flask was dissolved the prepolymer described in step A (4.7 g) in chlorobenzene (25 mL). Into the flask, over a period of eight hours was added 10 mL of a solution of ultra-pure dimethylbisureido silane which was made by dissolving the ureidosilane (2 g) in dry chlorobenzene (100 mL). A sample of the reaction was analyzed to insure excess ureido silane (H1 NMR analysis). If excess ureido silane was not detected, addition of the reagent was continued at the same rate until excess ureido silane was in evidence. The reaction contents were then back titrated with a solution of ultra-pure carboranedisilanol (about 8 mL or until no excess ureido was detected). The solution of carboranedisilanol was made by dissolving ultra-pure carboranedisilanol (2 g) in chlorobenzene (100 mL). The entire process, two additions, was repeated. The reaction mixture was then added to methanol (100 mL) to precipitate the final polymer.

The polymer was analyzed by gel permeation chromatography to determine the molecular weight (polystyrene standards, tetrahydrofuran solvent). Several reactions of this type were completed. The results of the experiments are shown in Table I and discussed with regard to Example 6.

EXAMPLE 6

This example presents data comparing the molecular weights of the polymers formed by the present process and the polymers formed by the prior art process of Stewart et al.

Three samples of polymers were prepared in accordance with the process of Stewart et al, previously referenced. Three samples of polymers were prepared in accordance with the present invention as described in Example 5 herein. Each of the polymers was analyzed by gel permeation chromatography to determine the molecular weight, using polystyrene standards and tetrahydrofuran solvent. The measured molecular weights of these polymers are shown in Table I below.

TABLE I

| COMPARATIVE DATA ON MOLECULAR WEIGHT OF POLYMER | |
| --- | --- |
| Sample Type/No. | Molecular Weight (Mn) |
| Stewart et al | |
| 1 | 14,000 |
| 2 | 33,000 |
| 3 | 47,000 |
| Present Invention | |
| 1 | 120,000 |
| 2 | 132,000 |
| 3 | 175,000 |

From the data presented in Table I, it is evident that the method of the present invention produces polycarborane siloxane polymers having significantly higher molecular weights than those available by prior art methods.

EXAMPLE 7

This example describes the second embodiment of the present invention in which the molecular weight of the polycarborane siloxane polymer is further increased by conducting the advancement of the prepolymer at elevated temperature.

A large batch of the silanol terminated prepolymer was synthesized as described in Example 5, Step A above. After drying, a portion of the prepolymer was advanced as described in Example 5, Step B above. The other portion of the prepolymer was advanced at elevated temperature (66° C.) in an otherwise identical manner. After workup and analysis the results shown in Table II were obtained.

TABLE II

| EFFECT OF TEMPERATURE ON MOLECULAR WEIGHT | | |
|---|---|---|
| Sample | Temperature of reaction | Molecular Weight (Mn) |
| A | 22° C. | 380,000 |
| B | 66° C. | 600,000 |

As indicated by the data in Table II, a significant increase in the molecular weight of the polycarborane siloxane polymer is achieved in accordance with the present invention by conducting the prepolymer advancement step at elevated temperature.

EXAMPLE 8

This example describes the third embodiment of the present invention in which a one-step process is used to form high molecular weight polycarborane siloxane polymers.

The reactants were prepared in an ultra-pure state as described in Examples 1–4 herein.

Ultra-pure carboranedisilanol (5.6 g) was placed in a three-neck flask. The flask was equipped with a septum, mechanical stirrer, and a solid addition funnel charged with ultra-pure methylphenylbisureido silane (3.2 g) and ultra-pure dimethylbisureido silane (5.6 g). The flask was cooled to −15° C. during which time chlorobenzene (5 mL) was added to the flask. After allowing the flask to cool to bath temperature, the two ureido monomers were added as a mixture of solids in several portions. The addition lasted approximately two hours. The flask was next cooled to −20° C. and maintained at this temperature for 20 hours. Then, the reaction mixture was added to methanol (100 ml) to precipitate the final polymer. The molecular weight of the polymer was determined by gel permeation chromatography to be about 400,000.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. In a method for the preparation of a very high molecular weight polycarborane siloxane polymer comprising the step of:
   (a) providing carborane bisdimethyl silanol in dried chlorobenzene solvent, to form a slurry and cooling said slurry to −10°±5° C.;
   (b) adding to said slurry a mixture of dimethylbisureido silane and methylphenylbisureido silane to form a reaction mixture at −10°±5° C.;
   (c) separating from said reaction mixture a silanol end-capped prepolymer of said polycarborane siloxane polymer;
   (d) dissolving said prepolymer in chlorobenzene to form a solution; and
   (e) adding to said prepolymer solution an excess of said bisuriedo silane selected from the group consisting of dimethylbisureido silane, methylphenylbisureido silane and a mixture thereof to form said very high molecular weight polycarborane siloxane polymer, wherein the improvement comprises:
      (i) providing said carborane bisdimethyl silanol in an ultra-pure state by dissolving said carborane bisdimethysilanol in a dry, oxygen-free mixture of hexane and toluene by heating to approximately 70° C. in providing carborane bisdimethyl silanol in dried cooling said first filtered solution to form a first crystalline product, and repeating said dissolving of said first crystalline product, said filtering, and said cooling for a total of 2 to 5 additional times;
      (ii) providing said dimethylbisureido silane in an ultra-pure state by dissolving said dimethylbisureido silane in a dry, oxygen-free mixture of diisopropyl ether and tetrahydrofuran by heating to approximately 60° C. in an inert atmosphere to form a second solution, filtering said second solution, and cooling said second filtered solution to form a second crystalline product, and repeating said dissolving of said second crystalline product, said filtering, and said cooling one time; and
      (iii) providing said methylphenylbisureido silane in an ultra-pure state by dissolving said methylphenylbisureido silane in dry, oxygen-free diisopropyl ether by heating to form a third solution, filtering said third solution, adding dry hexane to said third filtered solution to form a mixture and cooling said mixture to room temperature, to form a third crystalline product and repeating said dissolving of said third crystalline product, said filtering, said adding of hexane and said cooling two additional times;

whereby said polycarborane siloxane polymer has a molecular weight in excess of 120,000.

2. The method of claim 1 further comprising performing step (e) at a temperature within the range of 60° to 70° C. to thereby further increase the molecular weight of said polycarborane siloxane polymer to a value in excess of 500,000.

3. A method for preparation of a very high molecular weight polycarborane siloxane polymer comprising the steps of:
   (a) providing carborane bisdimethyl silanol in an ultra-pure state by dissolving said carborane bisdimethylsilanol in a dry, oxygen-free mixture of hexane and toluene by heating to approximately 70° C. in an inert atmosphere to form a first solution, filtering said first solution, and cooling said first filtered solution to form a first crystalline product, and repeating said dissolving of said first crystalline product, said filtering, and said cooling for a total of 2 to 5 additional times;

(b) providing dimethylbisureido silane in an ultra-pure state by dissolving said dimethylbisureido silane in a dry, oxygen-free mixture of diisopropyl ether and tetrahydrofuran by heating to approximately 60° C. in an inert atmosphere to form a second solution, filtering said second solution, and cooling said second filtered solution to form a second crystalline product, and repeating said dissolving of said second crystalline product, said filtering, and said cooling one time; and (c) providing methylphenylbisureido silane in an ultra-pure state by dissolving said methylphenylbisureido silane in dry, oxygen-free diisopropyl ether by heating to form a third solution, filtering said third solution, adding dry hexane to said third filtered solution to form a mixture and cooling said mixture to room temperature, to form a third crystalline product and repeating said dissolving of said third crystalline product, said filtering, said adding of hexane and said cooling two additional times;

(d) mixing said ultra-pure carborane bisdimethylsilanol in dried chlorobenzene solvent to form a slurry and cooling said slurry to $-15°\pm5°$ C.; and (e) adding to said slurry a predetermined amount of said ultra-pure dimethylbisureido silane and said ultra-pure methylphenylbisureido silane to form a reaction mixture and maintaining said reaction mixture at a temperature within the range of $-15°$ to $-20°$ C. for 6 to 20 hours, whereby said very high molecular weight polycarborane siloxane polymer is formed having a molecular weight in excess of 300,000.

* * * * *